March 27, 1962     J. E. MULAVEY ET AL     3,027,513

PHASE IDENTIFYING AND PHASE ANGLE INDICATING MEANS

Filed July 7, 1958     2 Sheets-Sheet 1

INVENTORS
JAMES E. MULAVEY
FRANK M. HARTZ
BY Whitemore Hulbert +
Belknap
ATTORNEYS March 27, 1962     J. E. MULAVEY ET AL     3,027,513
PHASE IDENTIFYING AND PHASE ANGLE INDICATING MEANS
Filed July 7, 1958                                    2 Sheets-Sheet 2
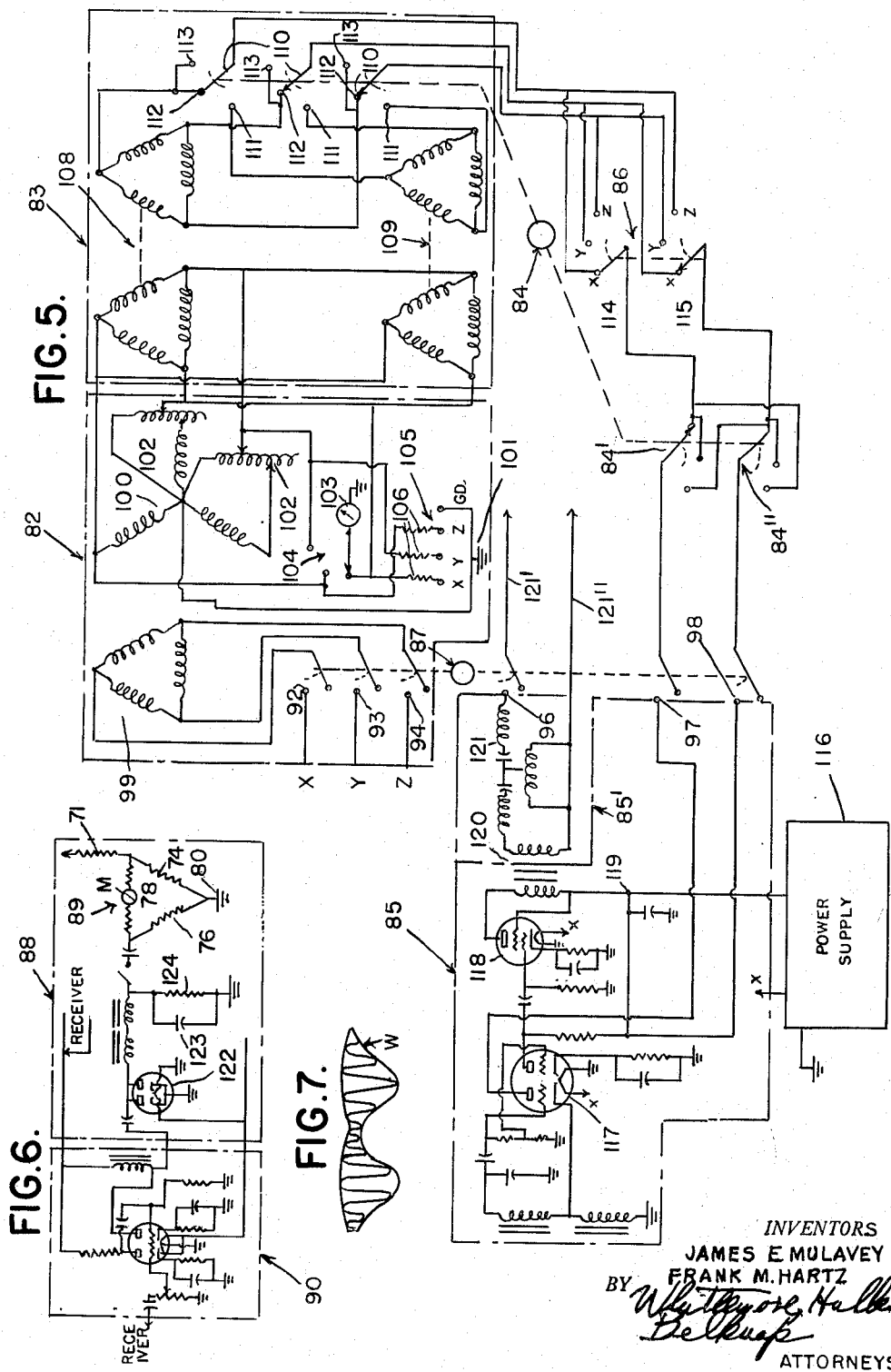
INVENTORS
JAMES E MULAVEY
FRANK M. HARTZ
BY
ATTORNEYS

United States Patent Office 3,027,513
Patented Mar. 27, 1962

3,027,513
PHASE IDENTIFYING AND PHASE ANGLE
INDICATING MEANS
James E. Mulavey and Frank M. Hartz, Detroit, Mich.,
assignors to The Detroit Edison Company, Detroit,
Mich., a corporation of New York
Filed July 7, 1958, Ser. No. 746,936
5 Claims. (Cl. 324—83)

The present invention relates to methods and apparatus for determining the phase relationship between alternating current voltages carried by different remotely located wires of a polyphase power distribution system.

It is an object of the present invention to provide a phasing system which will give a direct reading of the phase relationship of voltages carried by such different wires, as by comparison of a wire carrying a current of unknown phase angle with a known phase of a standard 3 phase alternating voltage, so that the system may be employed to readily and speedily identify the phase of the remote and unknown wire.

It is a further object of the present invention to provide a system of the character described which employs radio as a means for transmitting a standard reference signal of known phase to a remote point for the purpose of determining the phase relationship to this standard of an alternating voltage carried by any single wire at the remote point.

It is a further object of the present invention to provide means for identifying and comparing phases of different wires of a single power system which, in one embodiment thereof, includes means for converting the alternating sine wave voltage normally carried by the wires to a series of unidirectional pulses, and employs the pulses to energize and de-energize a trigger or meter circuit designed to read average current supplied thereto.

In another embodiment, it is an object of the invention to provide a phase identifying or "phasing" apparatus or system in which standard or reference signals are transmitted in a sine-wave form a amplitude-modulated by a selected phase of the known reference voltage. Refinements are provided to insure at the outset that the reference signals are properly balanced and equated to one another in relation to ground.

In accordance with this further improvement an arrangement is made to selectively couple a selected reference phase signal with a tone transmission oscillator and amplifier as determined by the character of the transformer connection of the line to be identified, for example, Y-delta, delta-delta or in a special phase relation to one of these standard transformer arrangements.

It is a further object of the invention to provide a phasing system in which the output of the oscillator amplifier referred to above is connected to the radio transmitter through an appropriately rated filter in order to preserve a symmetric sine wave signal for transmission, free from distortion such as may be introduced by reason of the phasing of the oscillator as combined with the low frequency modulation. The polarity of such a wave may thus be inverted 180° for transmission without affecting the accuracy of the phase identification at the receiver.

In accordance with a further object, the sine wave signal as received is intentionally distorted for the purpose of reducing unused amplitude components of one polarity, thus permitting a greater useful amplitude output of the opposite polarity to be applied to a phase detector and indicator unit associated with the receiver.

It is also an object of the invention, in accordance with the modification described in the preceding paragraphs, to provide a system in which phase shift provisions are incorporated, as in the form first referred to, to adjust angularly the phase of the sine form of the signal to be transmitted in relation to the phase of a standard voltage from which the transmitted signal is originally derived. Thus the system, in any of its three embodiments is able to balance out factors which introduce phase shift, such as the phase change normally occasioned in receiving and transmitting, the effect on phase relationship of the distance of the receiver from the transmitter, phase disturbances introduced due to the characteristics of components of the circuits and their condition, etc. Any of these factors may have a substantial effect on the accuracy of the indicated phase relation at the receiver and detector-indicator unit.

The invention also has a general object the provision of a novel method for phasing, qualitatively and also quantitavely, an unknown polyphase circuit in relation to a reference voltage of known phasing.

Other objects and features of the invention will become apparent as the description proceeds, especially when taken in conjunction with the accompanying drawings, wherein:

FIGURE 5 is a schematic diagram showing phase balancing and frequency shifting units or components of a modified embodiment of the system or apparatus of the invention, as combined with provisions by which these units are selectively connected to modulate an oscillator for transmission of a reference signal to a remote point;

FIGURE 6 is a schematic wiring diagram showing improvements, according to the modified system, in a receiver-connected distorting amplifier and phase detector-indicator unit; and FIGURE 7 diagrammatically indicates the effect of a distorting unit of the layout of FIGURE 6 in making available a maximum amplitude signal to drive the detector-indicator.

Figure 1:
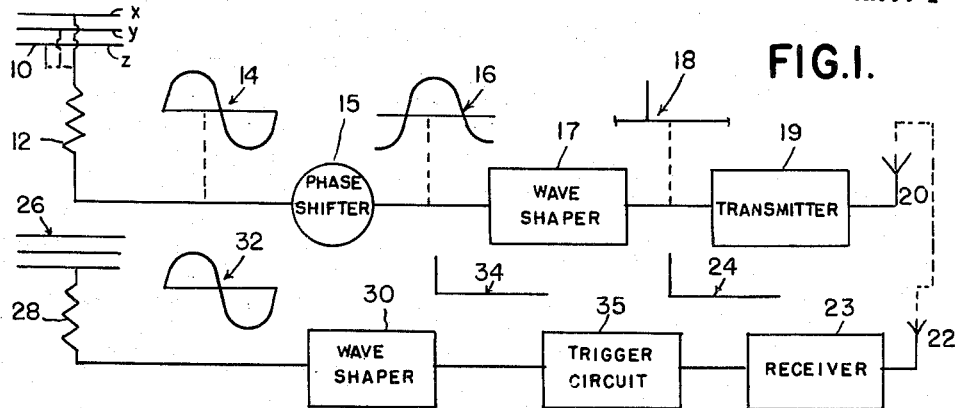
FIGURE 1 is a block diagram of a system for comparing the phase relationship of different wires.

Before referring to the figures, the problem solved by the present invention will be briefly described.

In the operation of a multi-phase distribution system such as employed by public utilities, serving heavy lighting and three phase industrial electrical power leads, it becomes necessary to establish additional power lines and circuits from time to time and to re-arrange and interchange electrical power loads on existing lines to meet customers' increased electrical demands. At times it is further necessary to establish additional substations in newly developed areas where present substation facilities are inadequate to care for the increased electrical loads.

In order to maintain continuity of electrical service and to maintain continuity of three phase motor rotation to customers during the establishing of these power lines and substations, it is necessary to interconnect two or more power lines to operate together, as the cutover work progresses. To interconnect any two power lines or circuits, the phase relationships of each line involved must first be definitely established with respect to each other, to determine which conductors of one line may safely be connected to the conductors of the other line. In the past, a small portable single phase transformer has been used, either at the substation or at a pole top, with a small lamp to indicate like and unlike phases, when the primary side of the transformer is connected to the alternate wires of the two circuits involved. In some cases the circuits involved are some distance apart and the phasing transformer cannot be used and visual tracing must be resorted to.

In addition, in some substations the transformers are connected delta-delta, and in others they are connected Y-delta. When two power lines from such different substantions are involved the small portable single phase transformer and its test lamp is not suitable for determining the phase relationships, because, under such circumstances the voltages to be measured are never zero. Prior to the present invention, and under such conditions, establishment of the phase relationships of the lines involved visual tracing of the lines to their substation. This is a slow and uncertain method.

In accordance with the present invention the phase of an unknown wire at a remote station, is determined by means which includes a radio transmitter for transmitting a standard signal from a base station such for example as a main station or substation. In general, the signal transmitted by the radio from the base station may be a frequency signal in which the signal as received is in the form of a variable sine wave voltage of standard frequency, such as for example as 60 cycles. In other cases the signal transmitted by radio from the base station and received at the comparing station may be in the form of a series of unidirectional pulses which for standard circuits will be transmitted at the rate of 60 pulses per second.

In either case the signal as received at the comparing station is compared with a signal derived from voltage variations on a wire to be tested and in general, if the unknown wire proves to be of the same phase as the known wire at the substation from which the radio transmitted signal was derived, a zero or null indication is obtained. As will readily appear, this zero or null indication may be deliberately shifted to provide a small positive reading.

Referring now to FIGURE 1 there is indicated at 10 three wires of a conventional three wire power system and the voltage in the system may be relatively low such as 120 volts, 240 volts, 480 volts, or it may be relatively high, as for example 4800 volts, 24,000 volts, 40,000 volts, or higher. In the figure the phases are designated as the $x$, $y$, and $z$ phases and of course the identity of these phases is a known factor at the base station. One of the wires is connected through a relatively large resistance 12 which may be several megohms, to a phase shifter. A single cycle of the variable voltage as it appears after passing through the high resistance 12 is indicated at 14. This variable voltage is applied to a phase shifter 15 which has the effect of shifting the phase of the variable voltage a predetermined amount. The amount of phase shift will be determined by several factors. In the first place, as will readily appear, the signal derived from the circuit 10 is transmitted by radio from the base station to a comparing station and this radio transmission and reception will inherently involve a phase shift. The amount of this phase shift may be determined by comparing the phase of the input to the transmitter and the output from the receiver when the transmitter and receiver are located at the base station. Other factors may be involved such for example as a phase shift resulting from transformers which will depend upon whether transformer connections are Y-delta, delta-Y, or delta-delta. As is well understood, a transformer connected delta-delta will result in substantial phase shift in the secondary with respect to the primary. In any case, the phase shifter is adjusted to produce a predetermined shift of phase so that the true phase relationship of the $x$-phase conductor with respect to the unknown conductor at the comparing station may be determined. The phase relationship on the same time base of the variable voltage after it has been acted upon by the phase shifter is indicated at 16. The phase shifter is connected to a wave shaper 17 whose function is to convert the usual variable sine wave voltage to a series of unidirectional pulses. In the case of the usual 60 cycle current sixty of these pulses are produced each second. The pulses in the proper timed relationship are illustrated at 18 in FIGURE 1.

The wave shaper is connected to a radio transmitter of any desired type such for example as AM, FM, long wave, short wave, micro wave, or the like, and a signal is transmitted from the antenna 20 of the transformer to an antenna 22 of a receiver 23 located at the comparing station. Due to the phase shift inherent in the transmission and reception by radio, the pulses as received at the receiver are as indicated at 24.

At the comparing station an unknown wire Q of a three phase system 26 is connected through a relatively large resistance 28 which, again, may be several megohms, to the wave shaper 30. The variable voltage as applied to the wave shaper is as indicated at 32 and as is apparent constitutes the usual sine wave voltage. The wave shaper 30 has the function of converting the sine wave voltage to a series of unidirectional pulses as indicated at 34, and it will be observed by comparing 24 and 34 that the variable pulses are in properly timed relationship, assuming that the unknown wire Q is the $x$-phase wire of the system. The pulses from the wave shaper 30 are transmitted to one side of a trigger circuit 35 and the pulses as received by the receiver 23 are transmitted to the other side of the trigger circuit. If these pulses are strictly in phase a meter M connected to the trigger circuit will read zero.

Figure 3:
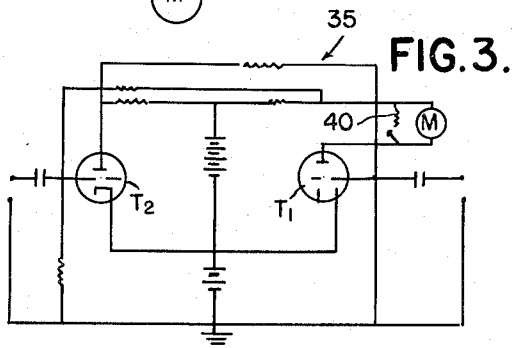
FIGURE 3 is a wiring diagram of a trigger circuit as employed in the block diagram of FIGURE 1.

The meter M is of a type designed to give a direct reading of average current and it is connected to the trigger circuit 35 as shown in FIGURE 3. The trigger circuit shown in this figure may be an Eccles-Jordon trigger circuit arranged such that when a pulse is received on the tube $T_1$ the circuit is triggered and plate current flows through the ammeter M. Current continues to flow through the meter M until a pulse is received by the tube $T_2$ which interrupts current flow through the meter M. Thus, if voltage in the wire Q in the circuit 26 lags the voltage in the $x$-phase of the circuit 10 by a very small amount, the meter will read approximately zero. If, however, the unknown wire Q in the circuit 26 is for example the $y$- or $z$-phase of the circuit, the current will flow through the meter for approximately one-third or two-thirds of a cycle and accordingly, if the meter is adjusted to read full scale under constant uninterrupted plate current of the tube $T_1$, the meter will read one-third or two-thirds scale if the unknown wire Q happens to be the $y$- or $z$-phase wire.

If it happens that the voltage in the wire Q leads the voltage in the $x$-phase wire at the reference station, substantially full scale deflection will be obtained in the meter. For this reason it is preferred to adjust the phase shifter 15 at the reference station so that instead of reading zero, a small positive reading will result if zero phase angle exists between the voltages on the wires $x$ and Q.

Preferably, the meter M connected to the trigger circuit 35 includes a range shunt 40 which may be opened to permit full current to pass through the meter and thus to produce large deflection of the needle. Thus, when the system has been adjusted and a small positive reading is provided in the meter, this reading may be multiplied by a factor of 10 or 100 to permit a more accurate determination of phase angle between voltages on the wires $x$ and Q.

The foregoing system not only permits ready identification of the phase of an unknown wire at the comparing station, but it permits identification of the wiring by direct inspection of the meter. As previously stated, if the signal from the reference station is derived from the $x$-phase wire, a small positive reading of the meter will result when the trigger circuit at the comparing station is connected to the $x$-phase wire thereat. If however, the wire at the comparing station turns out to be the $y$-phase wire, a reading in the neighborhood of 120 degrees will be obtained, while a connection to the $z$-phase wire at the comparing station will result in a meter reading of approximately 240 degrees.

Figure 2:
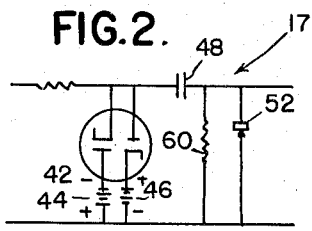
FIGURE 2 is a wiring diagram showing a wave shaper as employed in the block diagram of FIGURE 1.

Referring now to FIGURE 2, a typical wave shaper is indicated in which a double diode tube 42 is connected to dry cells 44 and 46 and constitutes a clipper, and a capacity 48 and resistance 50 constitute a wave peaker. In order to produce a single unidirectional pulse the wave shaper includes a rectifier 52.

Figure 4:
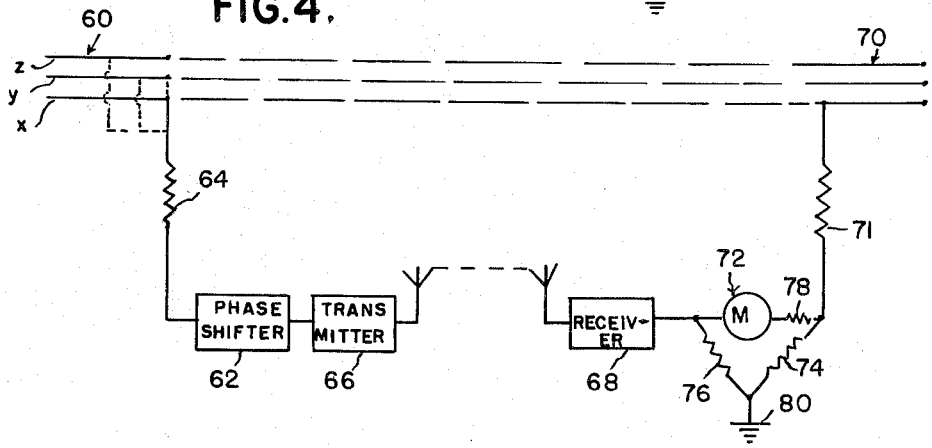
FIGURE 4 is a block diagram of a simplified form of apparatus for identifying the phase of an unknown conductor in a power circuit.

Referring now to FIGURE 4 there is illustrated a second embodiment of the present invention. In this FIGURE a three wire system is indicated at 60 having phases designated x, y and z. Means are provided for selectively connecting any one of the three phases x, y or z to a phase shifter 62 and this means includes a resistance 64 which may be several megohms in value, depending in part upon the voltage in the system 60. The output of the phase shifter 62 modulates the radio transmitter 66 which in turn transmits a signal to a receiver 68 located at a comparing station. It will be appreciated that the equipment connected to the circuit 60 is at a base station or substation where the various phases x, y, and z may be readily identified. In accordance with the present invention the unknown phases of a second three wire system 70 may be identified. In order to accomplish this one of the phases is connected through a resistance 71 of several megohms to a potential divider indicated generally at 72 and including resistances 74 and 76 which may for example be about 5,000 ohms where the circuits are 4800-volt circuits. The potential divider includes a meter M which may be a micro or milliammeter including a resistance 78. The potential divider is connected to ground as indicated at 80. At the comparing station the radio signal transmitted by the transmitter 66 is received by the receiver 68 in the form of a modulated sine wave frequency signal. Depending upon the particular type of radio transmitter and receiver, there may be substantial phase shift attributable to radio transmission and this phase shift is compensated for at the base station by suitable adjustment of the phase shifter 62.

If now, the sine wave voltage as applied to the potential divider from the system 70 through the resistance 71 is perfectly in phase with the signal as applied from the receiver 68 to the other side of the potential divider, it will be apparent that no current will flow through the meter and resistance 78, which will accordingly give a null or zero reading. This will indicate that the unknown wire of the system 70 which was selected for test is actually the same phase as the wire from the system 60 used to generate the signal.

Obviously, to obtain a null reading it is necessary to adjust the output of the radio receiver so that the signal strength is equal to the sine wave voltage applied to the potential divider through the resistance 71.

There is thus provided a system by means of which the unknown phase of a three wire system may be quickly identified by comparing it to a known phase, using radio transmission to derive a signal at the testing station, which may be remote from the base station.

As above described, the system shown in FIGURE 1 of the drawings employs wave shapers to convert the sine wave signals from the reference source 10 and the line 26 to be tested to instantaneous unidirectional signals. To this extent, the wave shapers afford a tool of great accuracy in detecting very slight differences in phase angle at the portable end of the system. It is to be understood that the system of FIGURE 4 may be modified to include shaper provisions of this type, if desired.

FIGURES 5 and 6 of the drawings schematically depict a modified and further refined system which operates on both its transmission and receiving sides with sine wave signals as does the form of FIGURE 4, and the system of FIGURES 5 and 6 has provisions to insure that both wave forms, i.e., as derived from a standard, known polyphase voltage source and from the unknown line to be phase tested, shall be free from any disturbance such as would introduce a phase disturbance apt to counteract or diminish the benefits of the system. These are of course wave shaping provisions in the broad sense of the embodiment of FIGURE 1, for the transmitted wave form is freed from local distortion inherently introduced by a higher frequency transmission tone signal on which the lower frequency envelope of the reference signal is formed. In reference to the signal as received and applied at the remote detector unit, its wave shape is altered materially, in that superfluous amplitude energy on one side of the wave is suppressed.

The system illustrated in FIGURE 5 comprises essentially a balancing transformer unit 82 by which the three phases of a known voltage source, assumed to be precise as to its phases, are equated to one another in relation to ground; a phase shifter unit 83 by which the output of the unit 82 is properly compensated for selective use, as in balancing out the phase disturbing factors described above, as well as to set the system for the testing of unknown lines energized through different types of transformer connections and phasings, delta-Y, delta-delta, etc.; a multiple pole switch, generally designated 84, by which the phases, appropriately shifted, are selectively applied, in regard to the mentioned transformer factor, to an oscillator and amplifier unit 85 in testing; a further switch unit 86 which selectively determines the particular reference signal phase which is to go to the oscillator unit 85, as otherwise selected by the setting of phase shifter unit 83 at switch 84; a still further multiple pole on-off switch 87 through which units 82, 83 are energized, the oscillator unit 85 receives its input, and in turn supplies a transmitter modulator (not shown); and a filter unit 85', shown as an output component of oscillator-amplifier unit 85, which filter smoothes out the distorting effect of high frequency oscillations on the symmetry of the envelope of the low frequency modulation voltage fed to the oscillator.

As illustrated in FIGURE 6, the detector-indicator or trigger unit of the system is generally designated 88, its indicator component at which the determination as to phase is read off being specially designated 89; while the reference numeral 90 generally designates a distorting amplifier unit through which the received reference signal is fed for amplitude shaping prior to application to the unit 88.

Referring again to FIGURE 5, the balancing transformer unit 82 is provided at on-off switch 87 with three input terminals 92, 93, 94 which will, in the use of the system, be connected to the X, Y and Z terminals of a known three phase power source, such as the secondary of a Y-delta service transformer (not shown), to deliver, say, 240 volts A.C. The three terminals 92, 93, 94 are poles of the six-pole switch 87, through which the units 82 and 83 are energized. The further poles 96, 97 and 98 of this switch are input and output terminals for the oscillator-amplifier unit 85, as will be described.

The contactors for the switch terminals 92, 93 and 94 are connected to the delta-connected coils of three single phase transformers, which serve as a primary 99 connected in delta-Y with a secondary 100, in a proper turns ratio of the primary coils. The neutral point of secondary 100 is grounded at 101.

Variable ratio coils 102 or variacs are connected as auto-transformers across two of the legs of Y secondary 100, so that adjustments of the taps to these coils permit the voltages of these two legs to be made equal to the voltage of the leg lacking a variac. For this purpose, a grounded A.C. volt meter 103 is in turn connected by a manually settable switch 104 with the respective legs, permitting adjustment of the variacs 102 so as to obtain three equal voltages across the secondary legs balanced in relation to ground.

The four terminals indicated X, Y, Z and ground, generally designated 105, are provided on the balancing unit 82 for the purpose of testing. These taps afford a means to bench check a remote receiver individually in the event of an otherwise unexplainable discrepancy in an indication at the trigger or detector-indicator unit 89 of the system. The X, Y and Z taps are connected to the terminals of switch 104 through dropping resistors 106.

In accordance with the modified system under consideration, two 115 volt, three phase phase shifters 108 and 109 are employed in the unit 83, the stators and rotors of these phase shifters being delta connected, and the respective stators are connected in parallel to the Y connected coils of secondary 100. The phase shifter 108 and 109 are arbitrarily related to one another in such manner that, under the selective control of the switch 84, the 60 cycle output of the balancing and phase shift units 82 and 83 will be applied to oscillator unit 85 for a test condition in which, say, the unknown lines are supplied by a Y-delta transformer substation, a delta-delta connected substation (in which setup the rotor of phase shifter 108 lags that of phase shifter 109 by 150 degrees), or a substation at which the circuit is 180 degrees out of phase with a delta-delta substation for example. In any of these selections, the rotor of the selected phase shifter is preferably locked relative to its stator.

In the position of the contactors 110 of the three upper, phase shifter sections of switch 84 which is shown in FIGURE 5, the three terminals 111, 112, 113 of each section being respectively connected to the rotor windings of phase shifters 108 and 109 as shown, the intermediate contact 112 is electrically engaged. This position of the contactors 110 selects the upper phase shifter 108, which sets the system to identify phases of, say, a delta-delta connected substation and its circuits. In the upper position 113 of the contactors 110 the phase shifter 108 will also be elected, but however, in a way to turn over the output by 180 degrees, which permits the identification of phases of certain special high voltage circuits, such as 24 and 40 k.v. circuits. These may be 180 degrees out of phase with a delta-delta substation in certain power distribution systems. The third or lowermost position of switch contactors 110 engage the same with contacts 111, and selection of the lower phase shifter 109 is made, whose rotor is locked in a position to forward a reference phase signal for the phase testing of a Y-delta connected substation and its circuits.

The switch 86 is a selector for connecting the X, Y and Z legs of the phase shifted output of unit 83 to the oscillator-amplifier unit 85. It contains two switch sections 114 and 115 which are connected through the two lower sections 84', 84'' of multiple pole switch, and through the two lower sections 97, 98 of the six poles of switch 87, with the modulation input terminals of the oscillator 85. The switch components 114 and 115 bear appropriate markings as indicated in FIGURE 5, so that in the X position of the contactors the right hand legs of the rotors of phase shifter 108 and 109 may be connected to the modulator terminals of oscillator 85. In the Y and Z positions, the bottom and left hand legs, respectively, are similarly connected.

The oscillator unit 85 is amplitude modulated by the selected 60 cycle voltage from phase shifter unit 83. It is preferably a 2000 cycle tone oscillator and amplifier of a stability of .2%. Actually, the oscillation frequency may be dropped to say, 1950 cycles per second or raised above 2000 cycles to any desired approximate value in the event an arbitrarily selected frequency should give rise to disturbance at detector-indicator 88, 89. The reference numeral 116 indicates a standard electronically regulated power supply unit, such as the RCA Model M1-7518-B, which will help to insure frequency stability of oscillator 85 and afford a convenient means, by a change of its output, to change, the percentage of modulation. Supply unit 116 should provide 6.3 volts A.C. heater input for the tubes 117, 118 of oscillator 85, plus a regulable plate voltage of 0–250 volts at terminal 119.

The tube 117 is a double 6F8 tube, the lefthand triode of which is a 2000 cycle oscillator and the 60 cycle modulating voltage is fed from switch sections 97 and 98 between terminal 119 to which the power supply unit 116 is connected and the lefthand anode. The modulation should be set at unit 116 not to exceed 80% in order that the oscillator maintain oscillation during negative modulation peaks. The right hand half of tube 117 and the tube 118, which may be a 6V6, are conventional amplifiers. The output tube 118 is matched to an appropriate resistance at output transformer 120.

An analysis of the 60 cycle modulated envelope of the transmission voltage from oscillator 85 will show that the upper amplitude peak of modulated envelope is displaced 5 degrees in phase from the lowermost next peak.

This results from the fact that since there are 33.3 cycles of the 2000 cycle corner wave for every cycle of the 60 cycle wave, 33 points define the modulated envelope. Each cycle of the 2000 cycle tone represents 10 degrees of the 60 cycle wave. Thus an upper or lower peak of the high frequency wave will be displaced 5 degrees from a corresponding peak of the low frequency wave.

In order to eliminate this error and obtain a truly symmetric wave form, which is invertible as to polarity without introducing a phase disturbance, a high Q band pass filter 121 tuned to 2000 cycles is connected to the output of amplifier tube 118. Thus with an error of 5 degrees produced by introduction of a small 60 cycle voltage component in the modulated wave, a filter 121 which can pass 2000 cycles and reject 60 cycles will cause the upper and lower peaks of modulation to be symmetric and fall directly the one over the other. The polarity may be turned over 180° without diminishing the accuracy of phase identification. The filter 121 feeds a transmitter (not shown) through leads 121', 121'', and the pole 96 of the sixth section of switch 87. The transmitter may be of any of the types hereinabove mentioned.

The detector-indicator unit 88 illustrated in FIGURE 6 of the drawings is generally similar to that shown in FIGURES 3 and 4, the double diode 122 performing the functions of tubes $T_1$ and $T_2$ shown in FIGURE 3. A .5 microfarad condenser 123 is connected across a 10,000 ohm load resistor 124 at the output of tube 122 to exert an integrating action designed to prevent the passing of any high frequencies. The indicator component 89 is similar to that appearing in FIGURE 4, accordingly, corresponding numerals and characters are employed to designate corresponding parts.

An improvement in the detector-indicator unit 88 as a whole involves the provision in advance thereof of the distorting amplifier 90. Amplifier 90 is connected appropriately to the output of a suitable portable field receiver and is designed to distort a wave form W received therefrom in the manner shown in FIGURE 7 of the drawings. It is seen by reference to FIGURE 7 that a superfluous and unused half of the signal which the detector unit 88 throws away is distorted by a substantial reduction of its peaks on one side. Amplifier 90 is designed to produce a lesser distortion and a gain in amplitude in the opposite half of the signal, which half is used by the detector-indicator unit 88.

In use, the distorting amplifier and detector combination 88—90 of FIGURE 6 is plugged into the A.M. radio frequency detector or F.M. discriminator stage of the radio receiver, whereas the detectors of FIGURES 1 and 4 are plugged into the audio power stage of the receiver. This avoids a variable phase shift factor which varies from receiver to receiver, to the same end of avoiding change in phase angle. The amplifier employs high quality paper condensers for cathode bypass, and noise disturbance is appreciably reduced by connecting the input circuit to an amplifier passing only high frequencies. The portable phase detector unit can operate with any type of receiver for the various types of transmission referred to above; and it is possible to maintain the phase identity of X, Y and Z reference signals received and applied thereto within plus or minus .8 degree.

By making slight modifications in the equipment it is possible to read directly on an appropriate meter M the exact angle of phase lag or lead of widely separated transmission lines in reference to any particular station, whether for the purpose of interconnecting circuits or simply to make an accurate quantitative determination in an easy expeditious way.

It is to be understood that references in the foregoing portion of the specification to radial transmission and reception are to be comprehensively construed to cover all methods, namely, Amplitude Modulation, Frequency Modulation, Phase Modulation, Pulse Time Modulation and Single Side-band.

The drawings and the foregoing specification constitute a description of the improved phase identifying and phase angle indicating means in such full, clear, concise and exact terms as to enable any person skilled in the art to practice the invention, the scope of which is indicated by the appended claims.

What we claim as our invention is:

1. Apparatus for identifying the phases of a polyphase electric power generating and distribution system at a location remote from a reference station, comprising means for developing an electric signal of known phase at a reference station, means for varying the phase of the developed electric signal selected fixed amounts in accordance with the phase difference between the polyphase electric power generating and distribution system and the developed electric signal due to constant phase characteristics inherent in different polyphase electric generating and distribution systems, an oscillator for developing a radio frequency carrier wave at the reference station, means for amplitude modulating the carrier wave with the electric signal of known phase, radio means at the reference station for transmitting the modulated carrier wave from the reference station to the remote location, radio means at the remote location for receiving the transmitted modulated carrier wave, means for detecting the modulation of the carrier wave received at the remote station to reproduce the signal of known phase, and means for comparing the reproduced signal of known phase with the unknown phases of the polyphase electric power system to identify them.

2. Apparatus as set forth in claim 1 wherein said radio signal comprises a plurality of precisely spaced, substantially instantaneous unidirectional, pulses.

3. Apparatus as set forth in claim 1 and further including filter means tuned to the carrier frequency connected to filter the output of the oscillator whereby a symmetrical carrier wave is transmitted so that complete inversion thereof will not produce a phase shift in the reproduced electric signal.

4. Apparatus as set forth in claim 1 and further including amplifier means for distorting the received modulated carrier wave to increase the amplitude of the used portion of the carrier wave and diminish the amplitude of the unused portion of the carrier wave.

5. Apparatus as set forth in claim 1 wherein the electric signal of known phase is a sixty cycle per second signal and the frequency of the carrier wave is two thousand cycles per second.

References Cited in the file of this patent

UNITED STATES PATENTS

| | | |
|---|---|---|
| 2,225,653 | Monk | Dec. 20, 1940 |
| 2,252,766 | Holden | Aug. 19, 1941 |
| 2,345,933 | Green | Apr. 4, 1944 |
| 2,410,843 | Shepherd | Nov. 12, 1946 |
| 2,412,111 | Wilson | Dec. 3, 1946 |
| 2,424,585 | Simon | July 29, 1947 |
| 2,506,818 | Sziklai | May 9, 1950 |
| 2,527,096 | Howes | Oct. 24, 1950 |
| 2,542,627 | Chevalier | Feb. 20, 1951 |
| 2,599,097 | Entz et al. | June 3, 1952 |
| 2,601,354 | Wylie | June 24, 1952 |
| 2,601,392 | Hammond | June 24, 1952 |
| 2,632,792 | Selz | Mar. 4, 1953 |
| 2,633,529 | Eltgroth | Mar. 31, 1953 |
| 2,903,508 | Hathaway | Sept. 8, 1959 |

OTHER REFERENCES

"An Electronic Phasemeter," article in Proceedings of the I.R.E., February 1949, pages 207–210.